(12) United States Patent
Boswell et al.

(10) Patent No.: US 12,510,032 B2
(45) Date of Patent: Dec. 30, 2025

(54) EXHAUST BRAKE VALVE

(71) Applicant: Power Packer North America, Inc., Westfield, WI (US)

(72) Inventors: Mark Jason Boswell, Corning, IA (US); Timothy Garritt House, Urbandale, IA (US)

(73) Assignee: Power Packer North America, Inc., Westfield, WI (US)

( * ) Notice: Subject to any disclaimer, the term of this patent is extended or adjusted under 35 U.S.C. 154(b) by 0 days.

(21) Appl. No.: 18/658,317

(22) Filed: May 8, 2024

(65) Prior Publication Data

US 2024/0384690 A1     Nov. 21, 2024

Related U.S. Application Data

(60) Provisional application No. 63/503,088, filed on May 18, 2023.

(51) Int. Cl.
    *F02D 9/10*     (2006.01)
(52) U.S. Cl.
    CPC ............. *F02D 9/107* (2013.01); *F02D 9/106* (2013.01)
(58) Field of Classification Search
    CPC .................................. F02D 9/106; F02D 9/107
    See application file for complete search history.

(56) References Cited

U.S. PATENT DOCUMENTS

| | | |
|---|---|---|
| 4,073,465 A | 2/1978 | Sheppard |
| 4,111,395 A | 9/1978 | Sheppard et al. |
| 4,213,595 A | 7/1980 | Sheppard et al. |
| 4,605,201 A | 8/1986 | Miyazaki |
| 5,630,571 A | 5/1997 | Kipp et al. |
| 5,669,350 A | 9/1997 | Altmann |
| 5,741,006 A * | 4/1998 | Murai ................... F16K 1/2265 251/305 |

(Continued)

FOREIGN PATENT DOCUMENTS

| | | |
|---|---|---|
| DE | 2427995 A1 | 6/1974 |
| DE | 2511501 A1 | 3/1975 |

(Continued)

OTHER PUBLICATIONS

European Patent Office Extended Search Report for Application No. 24176253.3 dated Oct. 17, 2024 (11 pages).

*Primary Examiner* — Kevin A Lathers
(74) *Attorney, Agent, or Firm* — Michael Best & Friedrich LLP

(57) ABSTRACT

A method of manufacturing a butterfly member of an exhaust brake valve assembly. The method includes providing a metal material, machining the metal material to form a body, and drilling a through bore in a central portion of the body, thereby delimiting a first side of the body from a second side of the body that is opposite the first side. The through bore is configured to receive a shaft for pivoting movement of the body in a valve housing of the exhaust brake valve assembly. The method further includes positioning the body for a single machining operation and machining the body to form a first sealing face on the first side of the body and a second sealing face on the second side of the body. The first sealing face defines a first plane and the second sealing face defines a second plane spaced from the first plane.

17 Claims, 9 Drawing Sheets

(56) References Cited

U.S. PATENT DOCUMENTS

| | | |
|---|---|---|
| 5,975,128 A | 11/1999 | Schatz et al. |
| 6,138,640 A | 10/2000 | Asanuma |
| 6,193,214 B1 | 2/2001 | Schatz et al. |
| 6,283,448 B1 | 9/2001 | Denton et al. |
| 6,698,717 B1 | 3/2004 | Brookshire et al. |
| 6,908,072 B2 | 6/2005 | Hattori et al. |
| 6,981,519 B2 | 1/2006 | Heckt et al. |
| 7,047,936 B2 | 5/2006 | Suzuki et al. |
| 8,434,506 B2 | 5/2013 | Nakamura et al. |
| 8,469,336 B2 | 6/2013 | Nakamura et al. |
| 9,217,377 B2 | 12/2015 | Gerards et al. |
| 9,739,241 B2 | 8/2017 | Bareis et al. |
| 9,752,687 B2 | 9/2017 | Bareis et al. |
| 10,697,377 B2 | 6/2020 | An et al. |
| 10,844,778 B2 | 11/2020 | An |
| 11,105,274 B1 | 8/2021 | Ishii et al. |
| 2004/0159818 A1* | 8/2004 | Vogler ............... F16K 1/22 251/308 |
| 2013/0299728 A1 | 11/2013 | Yokoyama et al. |

FOREIGN PATENT DOCUMENTS

| | | |
|---|---|---|
| DE | 2943986 A1 | 10/1979 |
| DE | 3509352 C2 | 3/1985 |
| DE | 4329526 A1 | 9/1993 |
| DE | 4329527 A1 | 9/1993 |
| DE | 19500475 C2 | 1/1995 |
| DE | 19929740 B4 | 6/1999 |
| DE | 19936457 A1 | 8/1999 |
| DE | 10159362 A1 | 12/2001 |
| DE | 102004056764 B4 | 11/2004 |
| DE | 102005014441 A1 | 11/2006 |
| DE | 102010007431 B4 | 2/2010 |
| DE | 112011105111 T5 | 3/2011 |
| DE | 102011106744 B3 | 6/2011 |
| DE | 102012107840 B4 | 8/2012 |
| DE | 102014112398 B4 | 8/2014 |
| DE | 102015104287 B4 | 3/2015 |
| DE | 102016107265 B4 | 4/2016 |
| DE | 102016107266 B4 | 4/2016 |
| DE | 102016223444 B3 | 11/2016 |
| DE | 102017112551 A1 | 6/2017 |
| DE | 102018127500 B4 | 11/2018 |
| DE | 102021102614 A1 | 2/2021 |
| EP | 0717815 A1 | 8/1994 |
| EP | 1200722 B1 | 7/2000 |
| EP | 1847738 B1 | 4/2006 |
| EP | 2213916 B1 | 10/2008 |
| EP | 2306053 B1 | 6/2009 |
| EP | 2726719 B1 | 5/2012 |
| EP | 2728158 B1 | 12/2012 |
| EP | 3279443 B1 | 3/2015 |
| EP | 3279444 B1 | 3/2015 |
| EP | 2574767 B1 | 7/2016 |
| EP | 3445960 B1 | 3/2017 |
| EP | 3647579 B1 | 10/2019 |
| ES | 246567 Y1 | 11/1979 |
| FR | 2279996 B3 | 3/1975 |
| FR | 2441062 A1 | 11/1979 |
| FR | 2833089 B1 | 12/2002 |
| FR | 2918145 B1 | 6/2007 |
| FR | 2918146 B1 | 4/2013 |
| FR | 3128756 A1 | 5/2023 |
| GB | 1482383 A | 4/1975 |
| GB | 2035516 B2 | 11/1979 |
| GB | 2249611 A1 | 11/1990 |
| GB | 2382862 A1 | 7/2002 |
| GB | 2441588 A | 3/2008 |
| JP | 2001173466 A | 6/2001 |
| WO | 9506808 A1 | 8/1994 |
| WO | 9506809 A1 | 8/1994 |
| WO | 9621815 A1 | 1/1996 |
| WO | 0109499 A1 | 7/2000 |
| WO | 9051011 A1 | 10/2008 |
| WO | 9157583 A1 | 6/2009 |
| WO | 12131777 A1 | 3/2011 |
| WO | 2012030222 A1 | 3/2012 |
| WO | 13000643 A1 | 5/2012 |
| WO | 16157363 A1 | 3/2015 |
| WO | 16157364 A1 | 3/2015 |
| WO | 17154204 A1 | 3/2016 |
| WO | 17182233 A1 | 3/2017 |

\* cited by examiner

EXHAUST BRAKE VALVE

CROSS-REFERENCE TO RELATED APPLICATIONS

This application claims priority to U.S. Provisional Patent Application No. 63/503,088 filed on May 18, 2023, the entire contents of which are incorporated herein by reference.

FIELD OF THE DISCLOSURE

The present disclosure generally relates to valve assemblies, and more particular, to exhaust brake valve assemblies.

SUMMARY OF THE DISCLOSURE

The present disclosure provides, in one independent aspect, a method of manufacturing a butterfly member of an exhaust brake valve assembly. The method includes a step of providing a metal material. The method also includes a step of machining the metal material to form a body. The method also includes a step of drilling a through bore in a central portion of the body, thereby delimiting a first side of the body from a second side of the body that is opposite the first side. The through bore is configured to receive a shaft for pivoting movement of the body in a valve housing of the exhaust brake valve assembly. The method also includes a step of positioning the body for a single machining operation. The method also includes a step of machining, during the single machining operation, the body to form a first sealing face on the first side of the body and a second sealing face on the second side of the body, thereby producing the butterfly member. The first sealing face defines a first plane and the second sealing face defines a second plane spaced from the first plane.

The present disclosure provides, in another independent aspect, a method of manufacturing a butterfly member of an exhaust brake valve assembly. The method includes a step of providing a valve housing having an interior surface. The method also includes a step of providing a metal material. The method also includes a step of machining the metal material to form a body configured to be positioned within the valve housing. The method also includes a step of drilling a through bore in a central portion of the body, thereby delimiting a first side of the body from a second side of the body that is opposite the first side. The method also includes a step of positioning the body for a single machining operation. The method also includes a step of machining, during the single machining operation, the body to form a first sealing face on the first side of the body and a second sealing face on the second side of the body, thereby producing the butterfly member. The first sealing face defines a first plane and the second sealing face defines a second plane spaced from the first plane. The body is formed to define a gap between a periphery of the body and the interior surface of the valve housing as the body pivots within the valve housing between a closed position and an open position. The gap defines a distance of at least 1.5 mm.

The present disclosure provides, in yet another independent aspect, a method of manufacturing a butterfly member of an exhaust brake valve assembly. The method includes a step of providing a metal material. The method also includes a step of machining the metal material to form a body. The body includes a first surface, a second surface opposite the first surface, a first spline formed on the first surface, the first spline extending between a central portion of the body and a periphery of the body, a second spline formed on the second surface, the second spline extending between the central portion of the body and the periphery of the body, and a plurality of protrusions formed on the first surface. The method also includes a step of drilling a through bore in the central portion of the body, thereby delimiting a first side of the body from a second side of the body that is opposite the first side. The method also includes a step of positioning the body for a single machining operation. The method also includes a step of machining, during the single machining operation, the body to form a first sealing face around the periphery of the body on the first side of the body and a second sealing face around the periphery of the body on the second side of the body, thereby producing the butterfly member. The first sealing face defines a first plane and the second sealing face defines a second plane spaced from the first plane.

DETAILED DESCRIPTION

Before any independent embodiments are explained in detail, it is to be understood that the disclosure is not limited in its application to the details of construction and the arrangement of components set forth in the following description or illustrated in the following drawings. The disclosure is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value and has the meaning dictated by the context (for example, the term includes at least the degree of error associated with the measurement of, tolerances (e.g., manufacturing, assembly, use, etc.) associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

The embodiment(s) described below and illustrated in the figures are presented by way of example only and are not intended as a limitation upon the concepts and principles of the present disclosure. As such, it will be appreciated that variations and modifications to the elements and their configuration and/or arrangement exist within the spirit and scope of one or more independent aspects as described.

Figure 1:
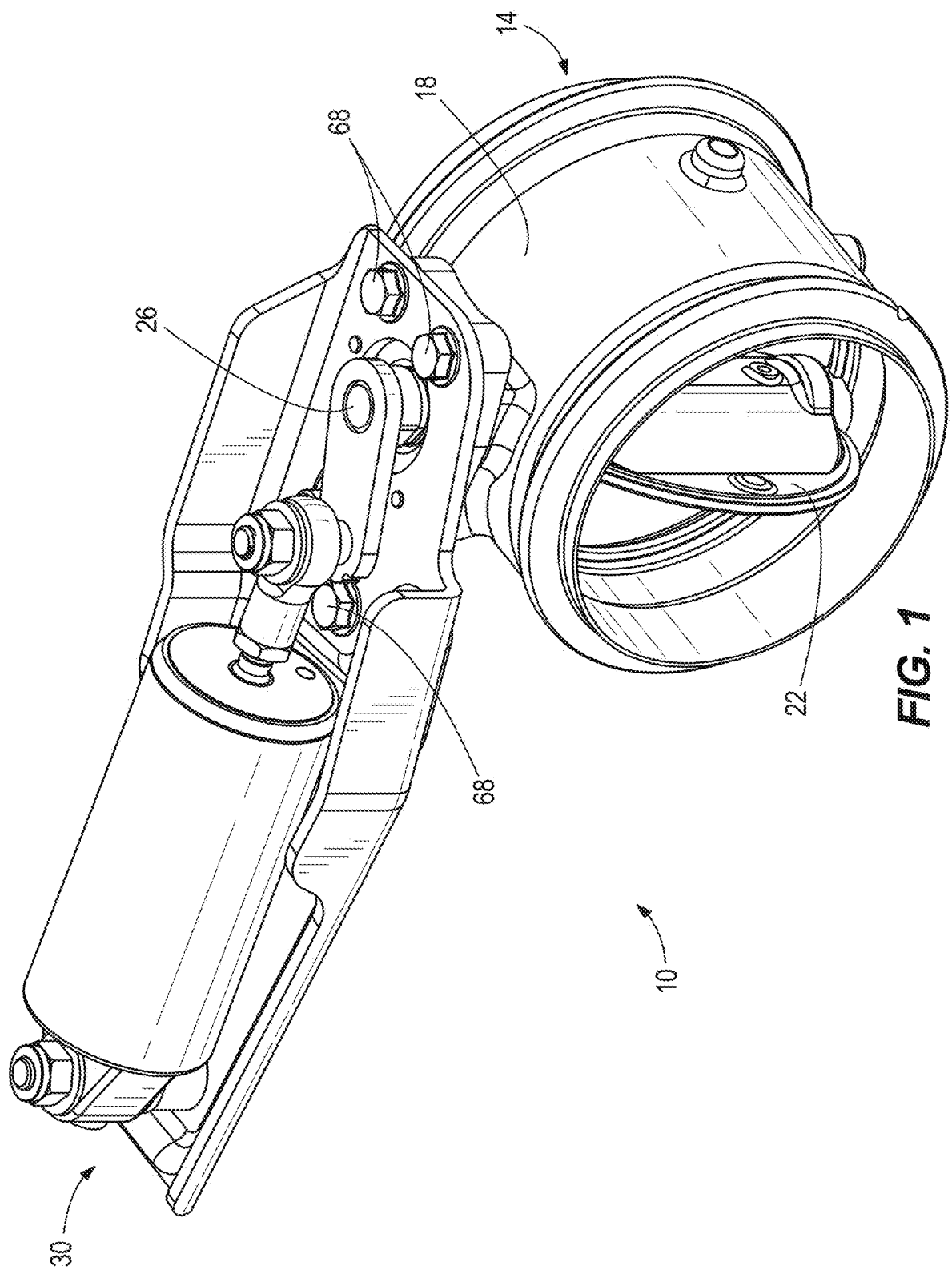
FIG. 1 is a perspective view of an exhaust brake valve assembly.

FIG. 1 illustrates a valve assembly 10, particularly an exhaust brake valve assembly, which is used in an exhaust system of a diesel-powered vehicle. Specifically, the valve assembly 10 is provided in an exhaust manifold of a diesel engine and is operable to create a back pressure in the exhaust system. The valve assembly 10 partially closes to restrict the flow of exhaust gas or completely close to inhibit the flow of the exhaust gas within the exhaust manifold to create the back pressure. As such, the exhaust gas becomes compressed in the exhaust manifold and in a cylinder of the engine. The valve assembly 10 slows the speed of the engine by way of the back pressure in the exhaust system, and thereby reduces the speed of the vehicle to provide braking.

The valve assembly 10 includes a valve housing 14 having a flow housing 18, a butterfly flap or butterfly member 22, and a shaft 26 coupled to the butterfly member 22. The butterfly member 22 is supported in the flow housing 18 by the shaft 26 for pivoting movement therewith between an open position, a closed position, and a plurality of intermediate pivoting positions defined between the open and closed positions. The valve assembly 10 further includes an actuation mechanism 30 operably coupled to the shaft 26 of the valve housing 14. The actuation mechanism 30 controls pivoting movement of the shaft 26 and the butterfly member 22 when the actuation mechanism 30 is activated.

Figure 2:
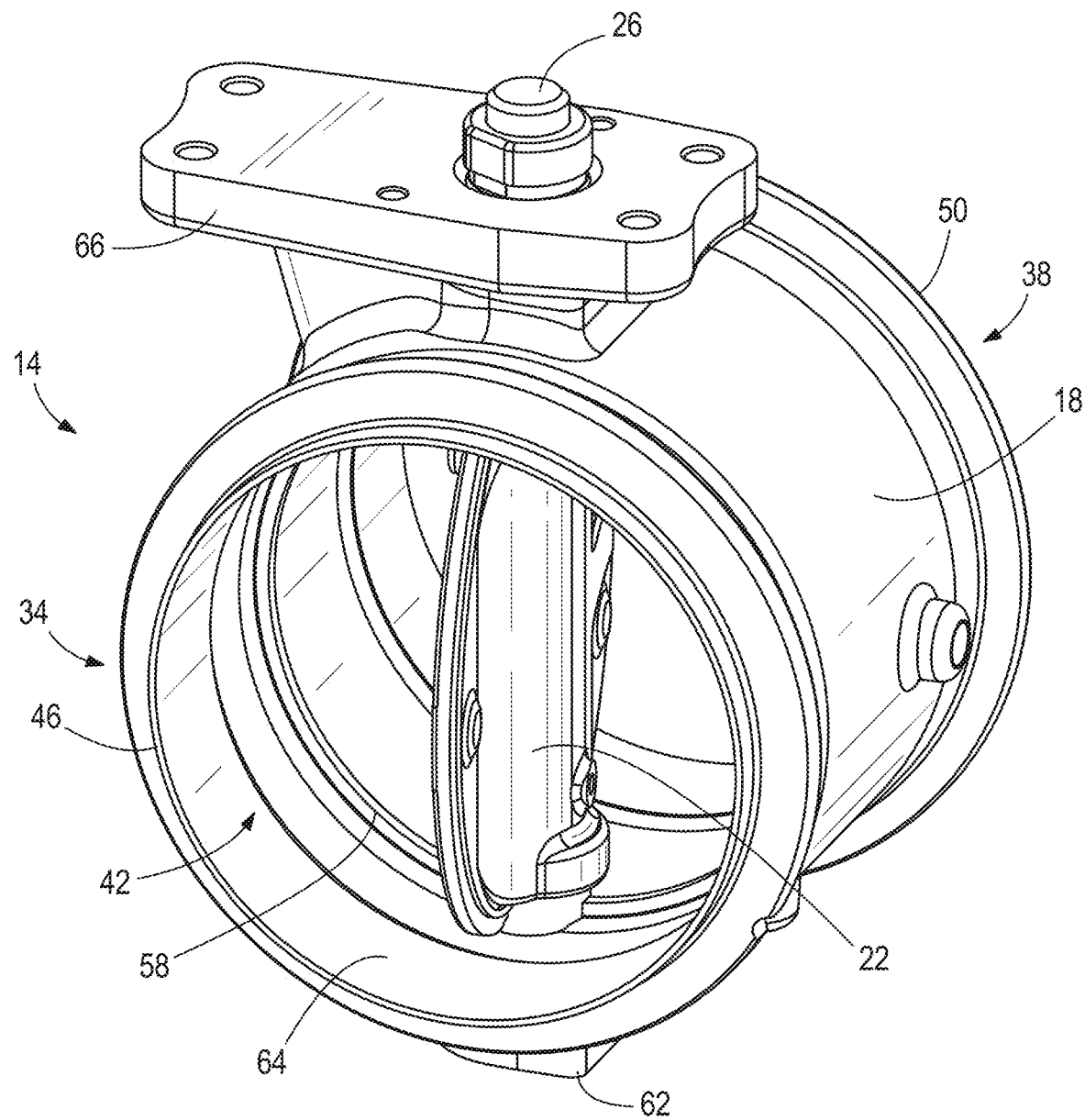
FIG. 2 is a perspective view of an exhaust brake valve of FIG. 1.
Figure 3:
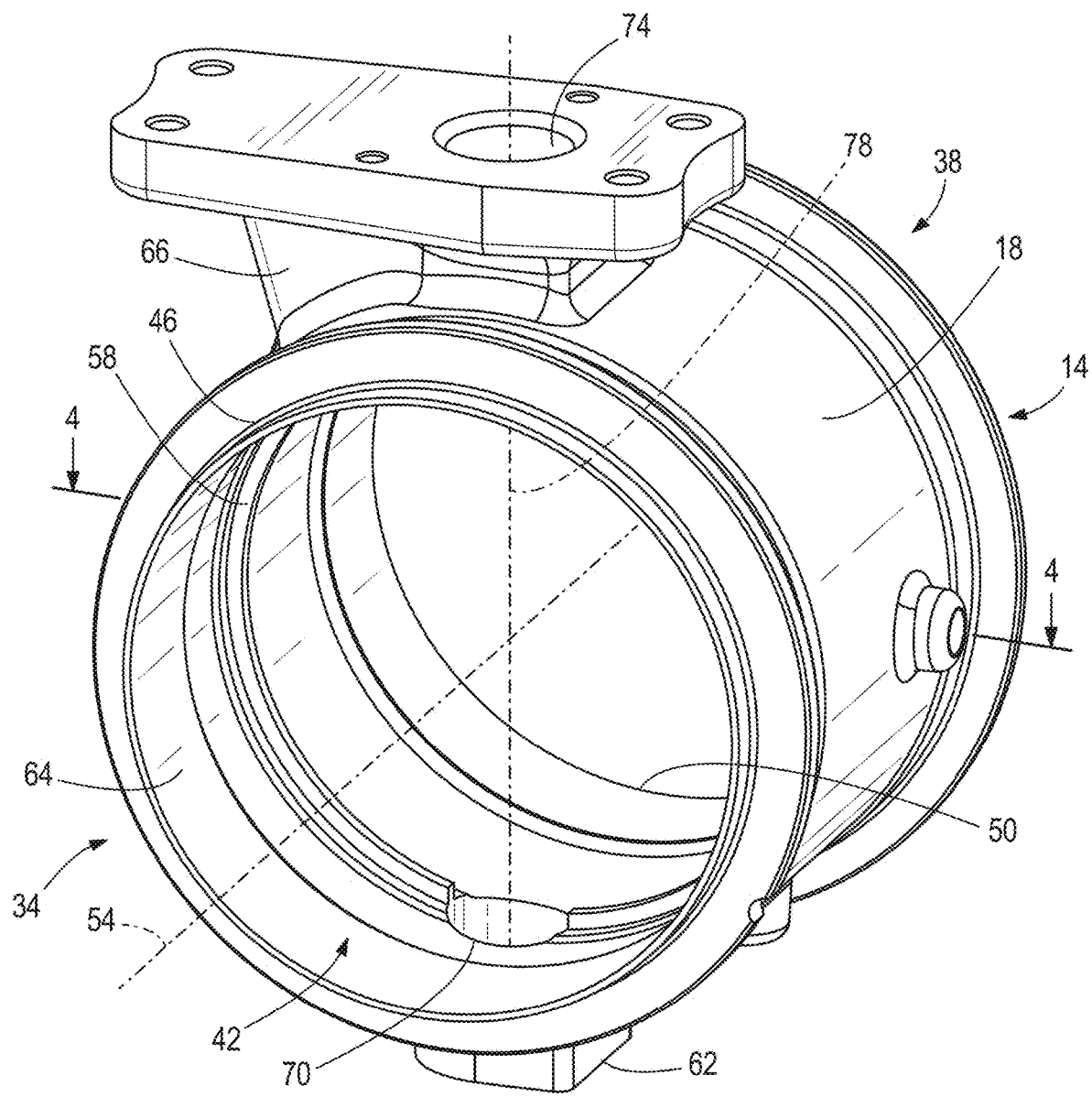
FIG. 3 is a perspective view of a valve housing of the exhaust brake valve of FIG. 2.
Figure 4:
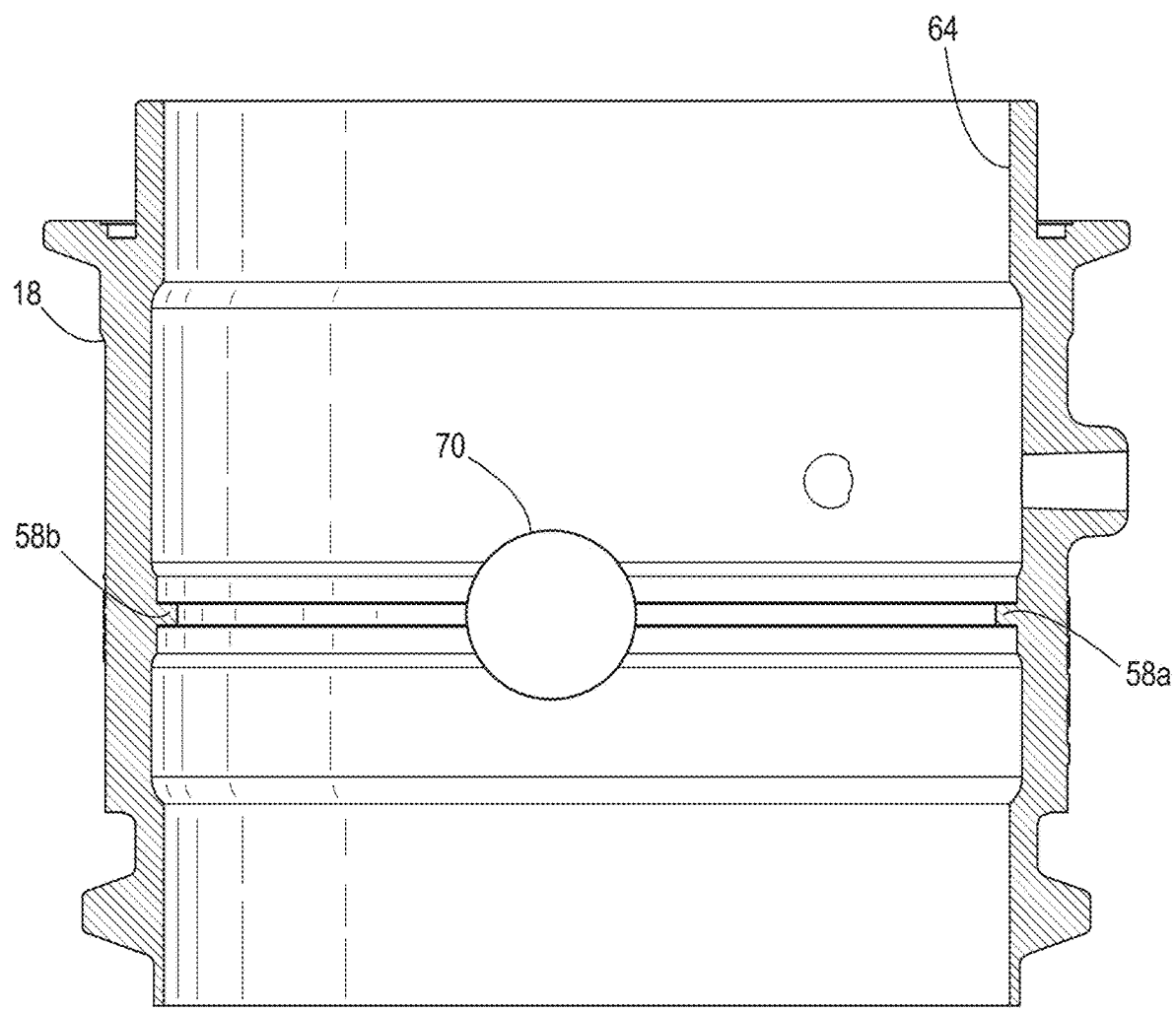
FIG. 4 is a top cross-sectional view of the valve housing of FIG. 3, taken generally along line 4-4 in FIG. 3.

With reference to FIGS. 2-4, the valve housing 14 is illustrated. The valve housing 14 is formed with a generally cylindrical shape between opposite ends 34, 38. The flow housing 18 of the valve housing 14 defines a flow passage 42 extending therethrough between a first flow opening 46 (e.g., inlet) at the first end 34 and a second flow opening 50 (e.g., outlet) at the second end 38. The flow passage 42 defines a flow axis 54 (FIG. 3) extending between the inlet and outlet 46, 50 of the flow passage 42. A sealing flange 58 extends from an interior surface 64 of the flow passage 42, such that the butterfly member 22 sealingly engages the sealing flange 58 to inhibit the flow of exhaust gas through the flow passage 42.

The valve housing 14 further includes a first shaft housing 62 extending from a bottom of the flow housing 18 and a second shaft housing 66 extending from a top of the flow housing 18. The second shaft housing 66 is coupled to the actuation mechanism 30 by a plurality of fasteners 68 (FIG. 1). The first shaft housing 62 defines a first bore 70 extending in a direction transverse to the flow axis 54. The second shaft housing 66 defines a second bore 74 that is coaxial with the first bore 70. The first bore 70 and the second bore 74 together define a shaft bore axis 78 (FIG. 3) transverse the flow axis 54. The first and second bores 70, 74 are proximate a center of the flow passage 42 and divide the sealing flange 58 into first and second sealing flange halves 58a, 58b (FIG. 4).

Figure 5:
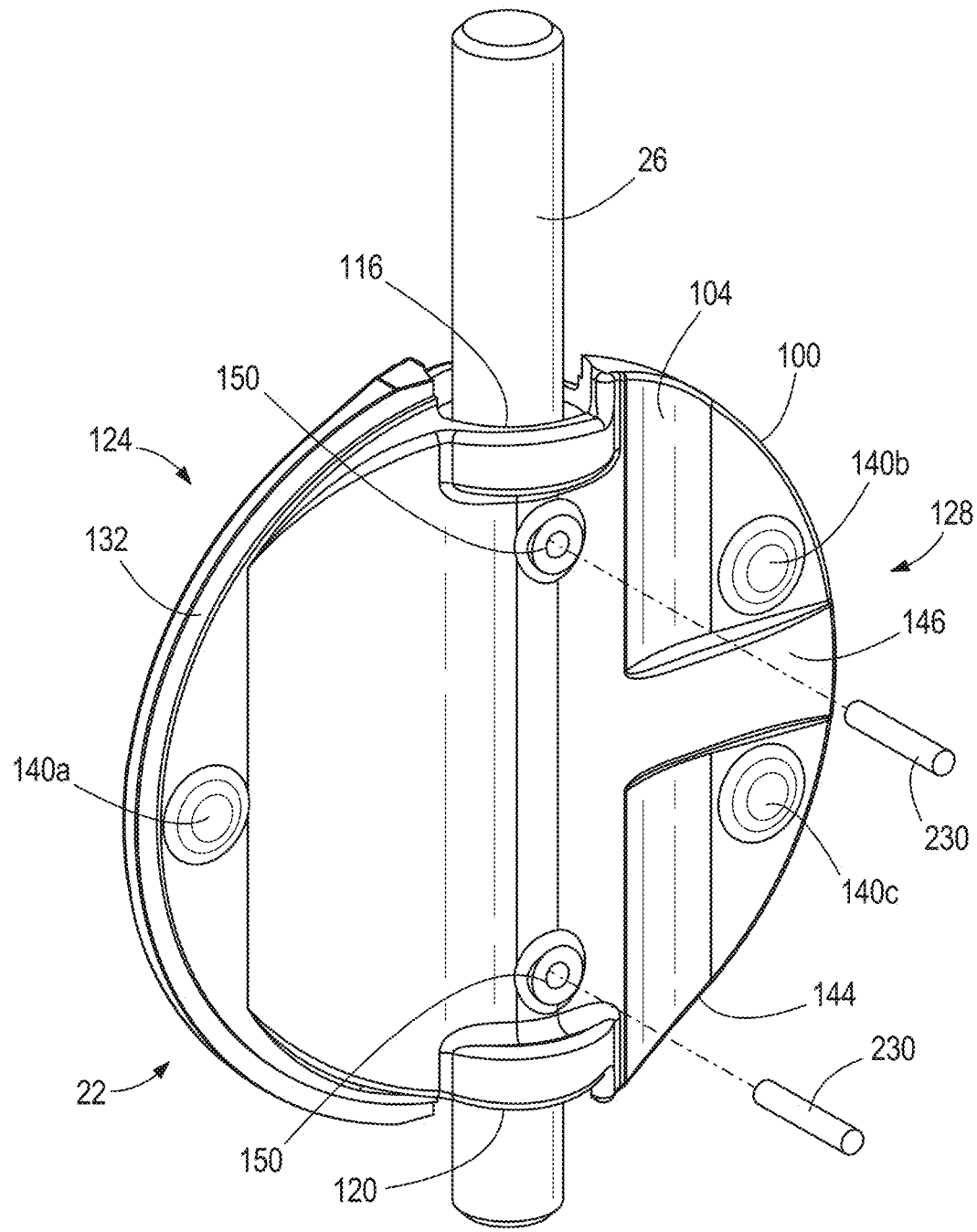
FIG. 5 is a front perspective view of a butterfly assembly of the exhaust brake valve of FIG. 2.
Figure 6:
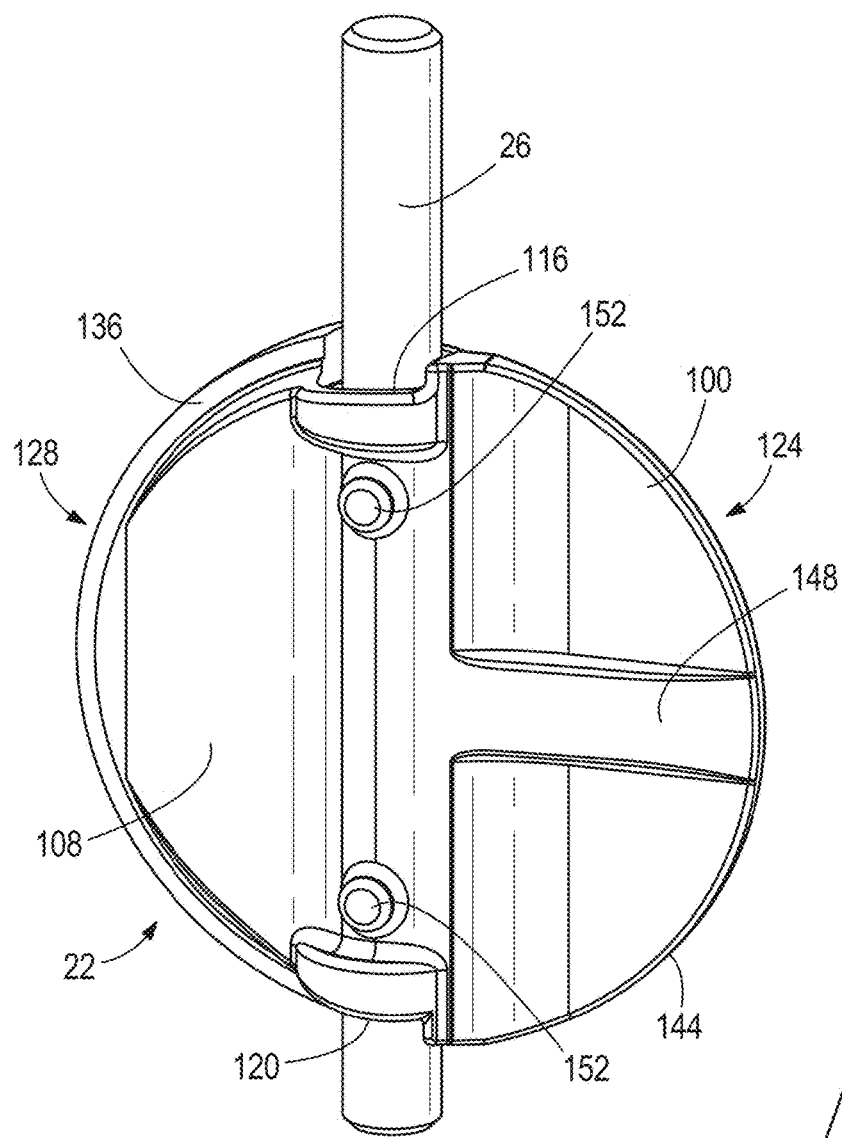
FIG. 6 is a rear perspective view of a butterfly assembly of the exhaust brake valve of FIG. 2.

With reference to FIGS. 2, 5 and 6, a butterfly assembly is illustrated. The butterfly assembly includes the butterfly member 22 and the shaft 26. The butterfly member 22 includes a body 100 formed by a first surface 104 and a second surface 108 opposite the first surface 104. The body 100 has a substantially circular shape to conform to the flow passage 42 of the flow housing 18. A through bore or a shaft bore 112 (FIGS. 9 and 10) extends through a central portion of the body 100 defined between a first end 116 of the shaft bore 112 and a second end 120 of the shaft bore 112 opposite the first end 116. Proximate the first and second ends 116, 120 of the shaft bore 112, flat edges along the body 100 are also formed. The shaft bore 112 defines a first side 124 of the body 100 of the butterfly member 22 and a second side 128 of the body 100 of the butterfly member 22 opposite the first side 124. Since the shaft bore 112 extends through the central portion of the body 100 of the butterfly member 22, the shaft bore 112 delimits the first side 124 from the second side 128. The butterfly member 22 further includes a first sealing face or first sealing surface 132 on the first side 124 of the body 100 of the butterfly member 22 and a second sealing face or second sealing surface 136 on the second side 128 of the body 100 of the butterfly member 22, which will be further discussed below.

The body 100 of the butterfly member 22 also includes a plurality of protrusions 140a-c (three, in the illustrated construction) formed on the first surface 104 of the body 100, in which the protrusions 140a-c have a circular shape. A first protrusion 140a of the plurality of protrusions 140a-c is formed on the first side 124 of the body 100 proximate a periphery 144 of the body 100. A second protrusion 140b and a third protrusion 140c of the plurality of protrusions 140a-c are formed on the second side 128 of the body 100, also proximate the periphery 144 of the body 100.

Moreover, the body 100 of the butterfly member 22 includes a first spline 146 formed on the first surface 104 of the body 100 and a second spline 148 formed on the second surface 108 of the body 100. The first spline 146 extends between the periphery 144 and the central portion of the body 100 on the second side 128 of the body 100. The second spline 148 extends between the periphery 144 and the central portion of the body 100 on the first side 124 of the body 100. The second and third protrusions 140b, 140c are located on opposite side of the first spline 146, while the first protrusion 140a aligns with the first spline 146. As such, the first and second splines 146, 148 provide structural strength to the butterfly member 22.

As discussed below, the butterfly member 22 is drilled to define pin holes 150 (two, in the illustrated construction) that extend through the first surface 104 of the body 100. Each pin hole 150 has a corresponding protrusion 152 extending from the second surface 108 of the body 100. The pin holes 150 and the protrusions 152 are aligned through a center of the shaft bore 112.

Figure 7:
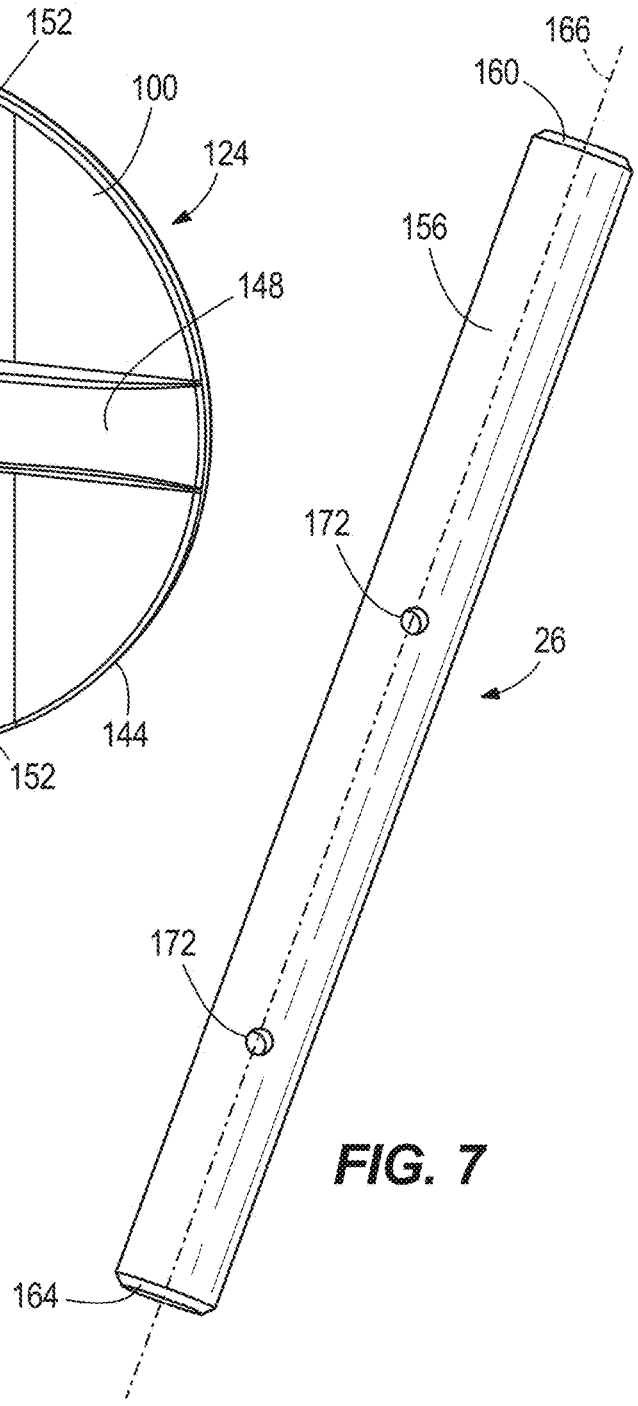
FIG. 7 is a perspective view of a shaft of the butterfly assembly of FIGS. 5 and 6.

With reference to FIG. 7, the shaft 26 includes a body 156 with opposite ends 160, 164 and extends along a shaft axis 166. A chamfered edge is formed on each end 160, 164 of the body 156 of the shaft 26. The shaft 26 is received within the shaft bore 112 of the butterfly member 22 so that the butterfly member 22 is pivotable with the shaft 26 in the valve housing 14. As discussed below, the shaft is drilled to define pin holes 172 corresponding to and, as installed, coaxial with the pin holes 150 drilled through the body 100 of the butterfly member 22.

Figure 8:
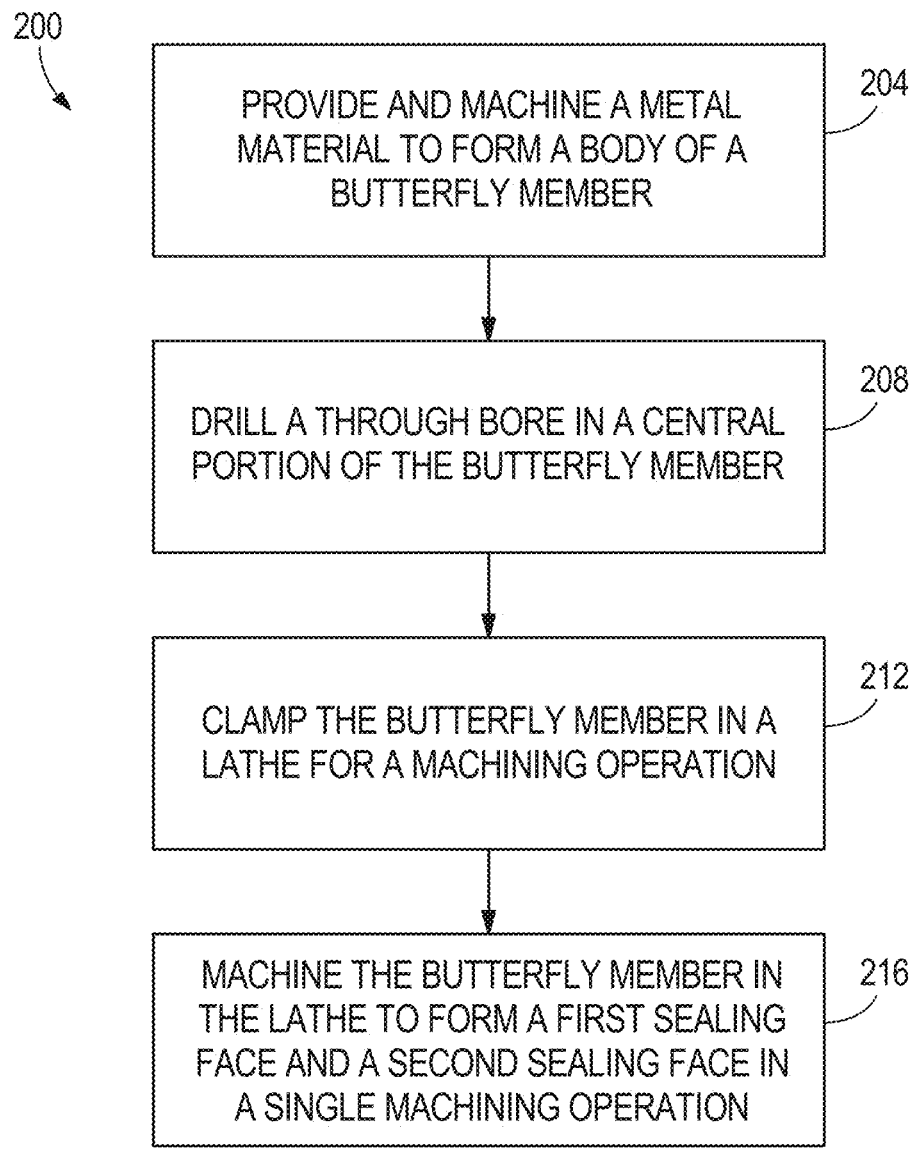
FIG. 8 is a block diagram of a method of manufacturing a butterfly member of the butterfly assembly of FIGS. 5 and 6.

With reference to FIG. 8, a method 200 for manufacturing the butterfly member 22 is provided. At block 204, a metal material is provided and machined to form the body 100 of the butterfly member 22. In some embodiments, the metal material is from a billet of stainless steel. More specifically, martensitic stainless steel can be used to form the butterfly member 22 for corrosion resistance. In other embodiments, the metal material is cast iron. When machining the metal material, rough machining is first performed to remove excess material. Rough machining of the metal material is performed until a workpiece of a desired shape and size, or a shape similar to a configuration of the butterfly member 22 is provided. Then, finish machining is performed to remove a small amount of material until the workpiece is within tolerance of the finial dimensions of the body 100 of the butterfly member 22. In other embodiments of manufacturing the butterfly member 22, a casting process is performed to form the body 100 of the butterfly member 22. After the casting process, the metal material is machined to form the first surface 104, the second surface 108, the first spline 146, the second spline 148, and the plurality of protrusions 140a-c.

At block 208, the shaft bore 112 is drilled into the central portion of the body 100 of the butterfly member 22. At block 212, the position of the butterfly member 22 is adjusted for a single machining operation. When adjusting the position of the butterfly member 22, the body 100 is particularly clamped in a lathe (not shown) for the single machining operation. The plurality of protrusions 140a-c provided on the body 100 serve as clamping reference points and datum references for use with machining processes. Clamping forces are exerted on the first surface 104 and the second surface 108 of the body 100. Specifically, the clamping forces are exerted on the second surface 108 at locations opposite the plurality of protrusions 140a-c to securely clamp the butterfly member 22 within the lathe. As such, the clamping forces are exerted at specific locations on the butterfly member 22 to prevent the butterfly member 22 from moving during the machining operation.

Figure 9:
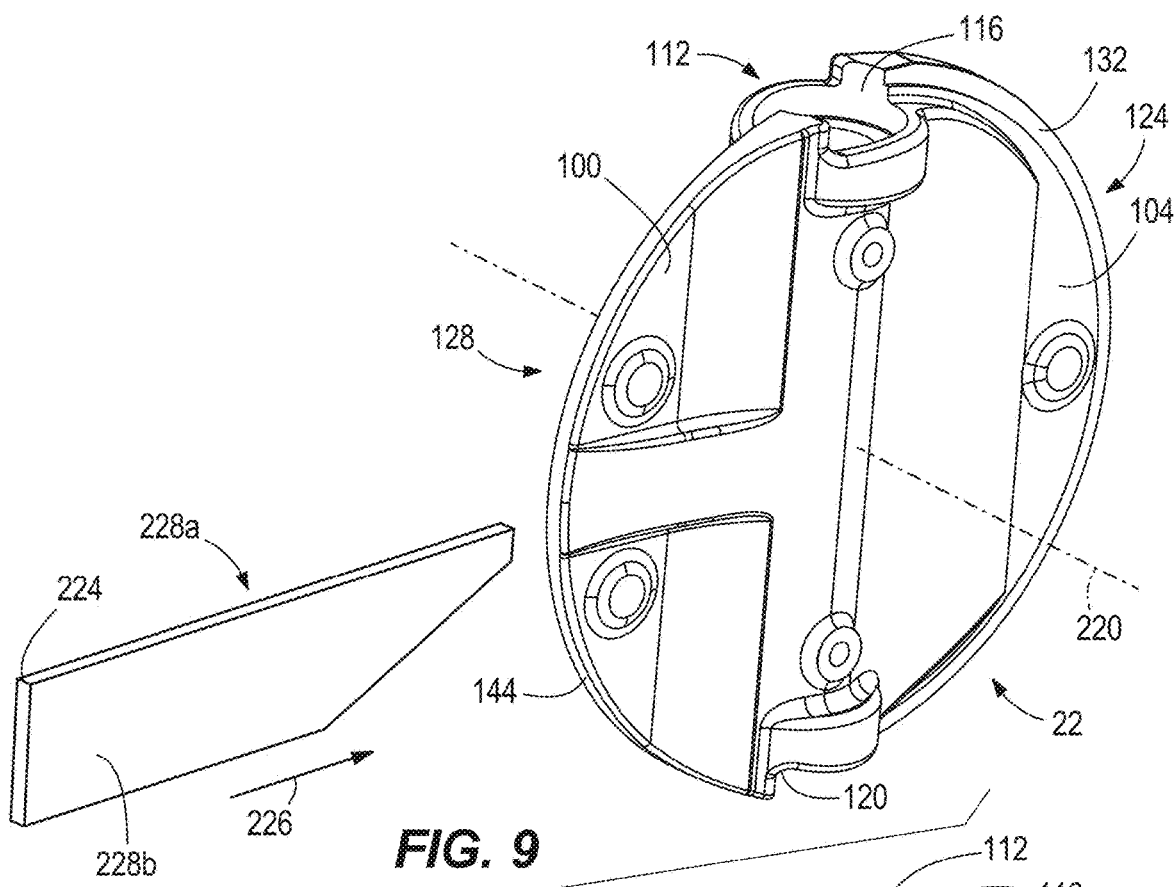
FIG. 9 is a perspective view of a first position of a cutting tool for machining the butterfly member of FIG. 8 to form a first sealing face and a second sealing face.

At block 216, the body 100 of the butterfly member 22 is machined in the lathe to form the first and second sealing surfaces 132, 136 in a single machining operation to produce the butterfly member 22. With reference to FIG. 9, the body 100 of the butterfly member 22 is securely clamped in the lathe. When the lathe is actuated, the body 100 rotates about a rotational axis 220 defined at a center point of the body 100. A cutting tool 224, provided on the lathe, moves towards the body 100 in a cutting direction, defined by arrow 226, perpendicular to the rotational axis 220.

Figure 10:
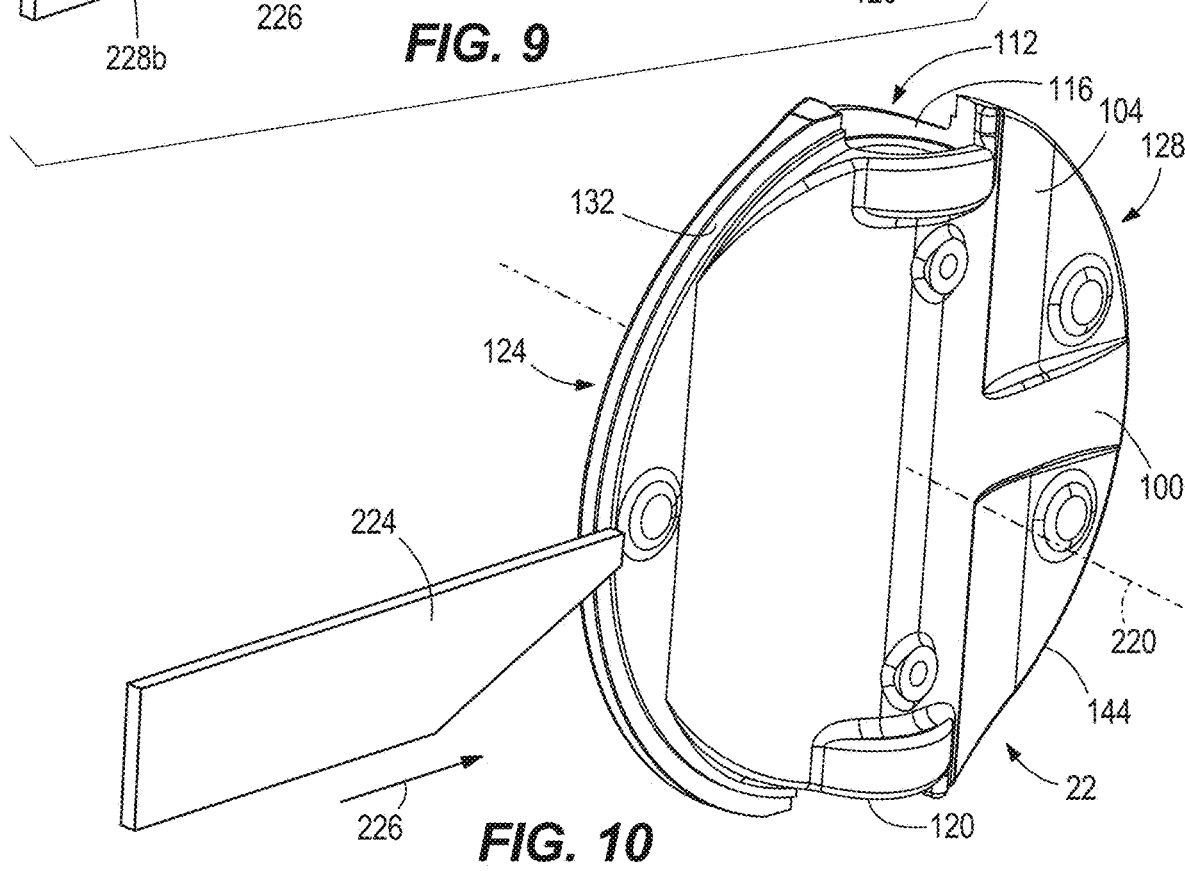
FIG. 10 is a perspective view of a second position of a cutting tool for machining the butterfly member of FIG. 8 to form a first sealing face and a second sealing face.

With reference to FIG. 10, the cutting tool 224 engages the body 100 of the butterfly member 22 to perform a facing operation to form the first and second sealing surfaces 132, 136 with consistent dimensions around the periphery 144 of the body 100. The facing operation begins once the cutting tool 224 contacts the periphery 144 of the body 100. As the cutting tool 224 continues to move in the cutting direction 266, material along the periphery 144 of the body 100 is removed. Rotation of the butterfly member 22 permits a first side 228a of the cutting tool 224 to engage and remove material from the first surface 104 of the body 100 at the first side 124 to form the first sealing surface 132. Further rotation of the butterfly member 22 permits a second side 228b of the cutting tool 224 to alternatively engage and remove material from the second surface 108 of the body 100 at the second side 128 to form the second sealing surface 136. The first and second sealing surfaces 132, 136 provide a step-like structure on the periphery 144 of the body 100. In addition, the first and second sealing surfaces 132, 136 are respectively formed to extend between the first end 116 and the second end 120 of the shaft bore 112 on the first and second sides 124, 128 of the body 100. As such, the first sealing surface 132 defines a first plane and the second sealing surface 136 defines a second plane parallel to and spaced a distance from the first plane.

In some embodiments, after manufacturing the butterfly member 22, the body 100 of the butterfly member 22 can undergo plating (e.g., nickel electroplating). The first and second surfaces 104, 108 of the body 100 are coated by a thin layer of nickel by using electroplating. As such, the nickel coating provides the butterfly member 22 with protection against corrosion, erosion, and abrasion. In other examples, the body 100 is coated by a ceramic-like slurry and placed in an oven to dry the butterfly member 22 to complete the coating process.

With reference to FIGS. 5 and 6, in some embodiments of the valve assembly 10, the butterfly assembly is assembled when the butterfly member 22 is positioned in the flow passage 42 of the flow housing 18, and the shaft 26 is inserted into the shaft bore 112 of the butterfly member 22 with the first end 160 extending a greater distance from the body 100 of the butterfly member 22 than the second end 164. The first end 160 of the shaft 26 is disposed in the second bore 74 of the second shaft housing 66, while the second end 164 of the shaft 26 is disposed in the first bore 70 of the first shaft housing 62. The pin hole(s) 150, 172 are then drilled into the butterfly member 22 and the shaft 26. Depending on the size and loading requirements of the butterfly member 22, the pin hole(s) 150, 172 have a diameter of between about 2 millimeters (mm) and about 12 mm.

After the pin holes 150, 172 are drilled, a pin 230 (FIG. 5) is inserted into each set of pin holes 150, 172. Each pin 230 has a diameter about 5% less than the diameter of the pin holes 150, 172 so that the pin 230 easily slips into the pin holes 150, 172 to accommodate loose, low cost tolerances between the components. Each pin 230 is fully inserted into the pin holes 150, 172 to be guided. After insertion, a tool (not shown) is positioned through a respective pin hole 150 so that a corresponding pin 230 is pressed between the tool and the inner surface of a corresponding protrusion 152 to make the pin 230 "swell" (e.g., increase in diameter) to match the form and diameter of the pin holes 150, 172. As such, material of the pin 230, the butterfly member 22 (proximate the pin hole 150) and the shaft 26 (proximate the pin hole 172) deforms to be retained together as a unitary structure.

Considering that the exhaust gas through the valve assembly 10 has a temperature of about 600° C. (1,112° F.), it is advantageous that the components of the butterfly assembly expand and contract at the same rate in response to temperature changes. Components formed of materials with different coefficients of thermal expansion will expand and contract at different rates, causing connections between the components to loosen. To maintain connection of the butterfly assembly components during operation of the valve assembly 10 (e.g., heating and cooling), the material(s) (e.g., austenitic stainless steel, ferritic stainless steel, martensitic stainless steel, tool steel, etc., depending on application requirements) of the butterfly member 22, the shaft 26, and the pin(s) 230 have substantially equal coefficients of thermal expansion.

In operation, the actuation mechanism 30 is operated to rotate the shaft 26 of the butterfly assembly, and thereby pivot the butterfly member 22. The butterfly member 22 is pivoted between the closed position and the open position to control the flow of exhaust gas within the exhaust system. In the open position, the butterfly member 22 is oriented in a direction parallel to the flow axis 54 to allow the flow of the exhaust gas from the inlet 46 of the flow passage 42 to the outlet 50 of the flow passage 42 for exhaustion from the exhaust system.

Figure 11:
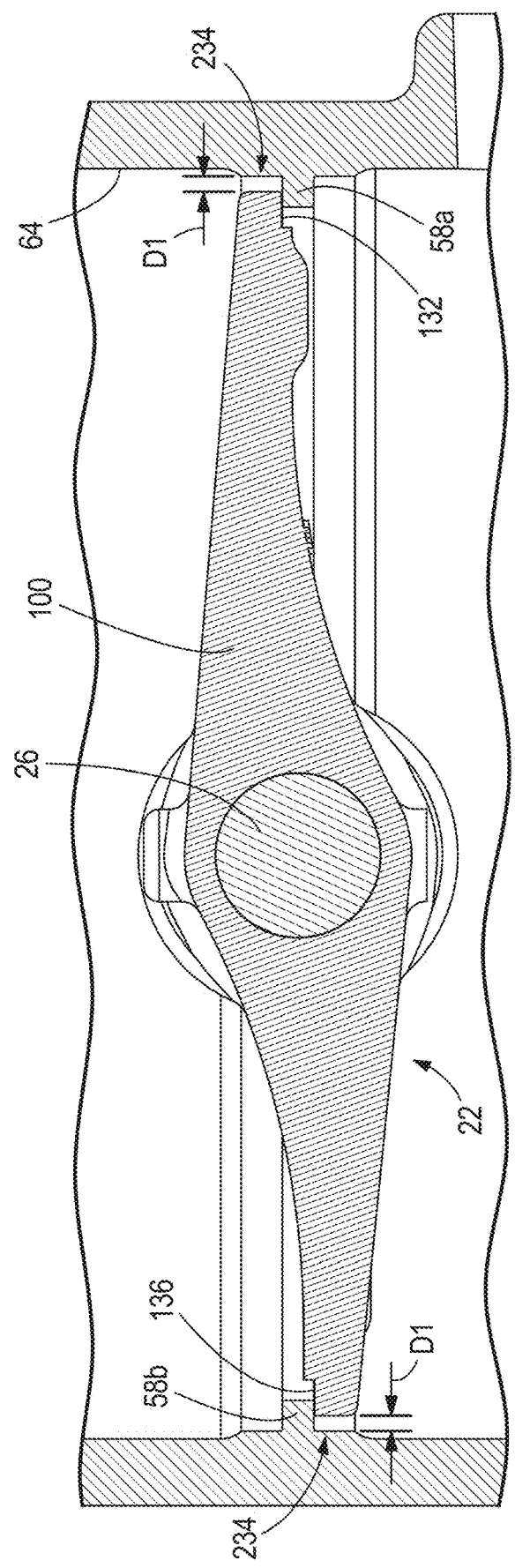
FIG. 11 is a top view of the exhaust brake valve of FIG. 2 in a closed position.

In reference to FIG. 11, the butterfly assembly is illustrated in the closed position. The butterfly member 22 is oriented perpendicular to the flow axis 54. The first sealing surface 132 of the butterfly member 22 sealingly engages the first sealing flange half 58a, while the second sealing surface 136 of the butterfly member 22 sealingly engages the second sealing flange half 58b. The flow of the exhaust gas from the inlet 46 of the flow passage 42 to the outlet 50 of the flow passage 42 is inhibited.

The butterfly member 22 is manufactured such that a gap 234 is defined between the interior surface 64 of the flow passage 42 and the periphery 144 of the body 100 when the butterfly member 22 is in the closed position. The gap 234 defines a distance D1 of at least 1.5 mm. In all positions of the butterfly member 22, including the intermediate pivoting positions, the distance of the gap 234 remains to be at least 1.5 mm. The manufactured gap 234 prevents the butterfly member 22 from contacting, other than the sealing flange 58, the interior surface 64 of the flow passage 42 when the butterfly member 22 pivots within the flow housing 18. Corrosion is then inhibited from forming between the butterfly member 22 and the interior surface 64 of the flow passage 42. As such, pivoting movement of the butterfly member 22 will not be obstructed by corrosion.

Although the invention has been described in detail with reference to certain preferred embodiments, variations and modifications exist within the scope and spirit of one or more independent aspects of the invention as described.

What is claimed is:

1. A method of manufacturing a butterfly member of an exhaust brake valve assembly, the method comprising:
    providing a metal material;
    machining the metal material to form a body;
    drilling a through bore in a central portion of the body, thereby delimiting a first side of the body from a second side of the body that is opposite the first side, the through bore configured to receive a shaft for pivoting movement of the body in a valve housing of the exhaust brake valve assembly;
    positioning the body for a single machining operation; and
    machining, during the single machining operation, the body to form a first sealing face on the first side of the body and a second sealing face on the second side of the body, thereby producing the butterfly member,
    wherein the first sealing face defines a first plane and the second sealing face defines a second plane spaced from the first plane,
    wherein the step of machining the metal material includes machining the metal material such that the body includes a first surface, a second surface that is opposite the first surface, a plurality of protrusions formed on the first surface, a first spline formed on the first surface and extending between the central portion of the body and a periphery of the body on the first side of the body, and a second spline formed on the second surface and extending between the central portion of the body and the periphery of the body on the second side of the body, and
    wherein the step of positioning the body includes clamping the body in a lathe by exerting a force on the second surface at a first location disposed opposite a first of the protrusions that is formed on the first side of the body proximate the periphery of the body, a second location disposed opposite a second of the protrusions that is formed on the second side of the body proximate the periphery, and a third location disposed opposite a third of the protrusions formed on the second side of the body proximate the periphery, and wherein the second and third protrusions are located on opposite sides of the first spline.

2. The method of claim 1, wherein the step of machining, during the single machining operation, includes moving a cutting tool provided on a lathe to remove material from the periphery of the body as the body rotates about a rotational axis to form the first and second sealing faces, thereby providing a step-like structure on the periphery of the body.

3. The method of claim 2, wherein the step of machining, during the single machining operation, includes rotating the body so that a first side of the cutting tool engages and removes material from the first surface of the body at the first side of the body as the cutting tool moves in a cutting direction perpendicular to the rotational axis to form the first sealing face extending between a first end of the through bore and a second end of the through bore.

4. The method of claim 3, wherein the step of machining, during the single machining operation, includes rotating the body so that a second side of the cutting tool opposite the first side of the cutting tool engages and removes material from the second surface of the body at the second side of the body as the cutting tool moves in the cutting direction to form the second sealing face between the first end of the through bore and the second end of the through bore.

5. The method of claim 1, wherein the method further comprises:
    after the step of machining the body, plating the body with a layer of nickel.

6. The method of claim 1, wherein the step of providing a metal material includes providing a metal material that includes stainless steel.

7. The method of claim 1, wherein the step of providing a metal material includes providing a metal material that includes martensitic stainless steel.

8. A method of manufacturing a butterfly member of an exhaust brake valve assembly, the method comprising:
    providing a valve housing having an interior surface;
    providing a metal material;

machining the metal material to form a body configured to be positioned within the valve housing;

drilling a through bore in a central portion of the body, thereby delimiting a first side of the body from a second side of the body that is opposite the first side;

positioning the body for a single machining operation; and machining, during the single machining operation, the body to form a first sealing face on the first side of the body and a second sealing face on the second side of the body, thereby producing the butterfly member, wherein the first sealing face defines a first plane and the second sealing face defines a second plane spaced from the first plane, and wherein the body is formed to define a gap between a periphery of the body and the interior surface of the valve housing as the body pivots within the valve housing between a closed position and an open position, the gap defining a distance of at least 1.5 mm.

9. The method of claim 8, wherein the step of machining the metal material includes machining the metal material such that the body includes a first surface, a second surface that is opposite the first surface, a plurality of protrusions formed on the first surface, a first spline formed on the first surface and extending between the central portion of the body and the periphery of the body on the first side of the body, and a second spline formed on the second surface and extending between the central portion of the body and the periphery of the body on the second side of the body.

10. The method of claim 9, wherein the step of positioning the body includes clamping the body in a lathe by exerting a force on the second surface at a first location disposed opposite a first of the protrusions that is formed on the first side of the body proximate the periphery of the body, a second location disposed opposite a second of the protrusions that is formed on the second side of the body proximate the periphery, and a third location disposed opposite a third of the protrusions formed on the second side of the body proximate the periphery, the second and third protrusions are located on opposite sides of the first spline.

11. The method of claim 9, wherein the step of machining, during the single machining operation, includes moving a cutting tool provided on a lathe to remove material from the periphery of the body as the body rotates about a rotational axis to form the first and second sealing faces, thereby providing a step-like structure on the periphery of the body.

12. The method of claim 11, wherein the step of machining, during the single machining operation, includes rotating the body so that a first side of the cutting tool engages and removes material from the first surface of the body at the first side of the body as the cutting tool moves in a cutting direction perpendicular to the rotational axis to form the first sealing face extending between a first end of the through bore and a second end of the through bore.

13. The method of claim 12, wherein the step of machining, during the single machining operation, includes rotating the body so that a second side of the cutting tool opposite the first side of the cutting tool engages and removes material from the second surface of the body at the second side of the body as the cutting tool moves in the cutting direction to form the second sealing face between the first end of the through bore and the second end of the through bore.

14. A method of manufacturing a butterfly member of an exhaust brake valve assembly, the method comprising:

providing a metal material;

machining the metal material to form a body, wherein the body includes:
 a first surface,
 a second surface opposite the first surface,
 a first spline formed on the first surface, the first spline extending between a central portion of the body and a periphery of the body,
 a second spline formed on the second surface, the second spline extending between the central portion of the body and the periphery of the body, and
 a plurality of protrusions formed on the first surface;

drilling a through bore in the central portion of the body, thereby delimiting a first side of the body from a second side of the body that is opposite the first side;

positioning the body for a single machining operation; and machining, during the single machining operation, the body to form a first sealing face around the periphery of the body on the first side of the body and a second sealing face around the periphery of the body on the second side of the body, thereby producing the butterfly member, wherein the first sealing face defines a first plane and the second sealing face defines a second plane spaced from the first plane, and wherein the step of positioning the body includes clamping the body in a lathe by exerting a force on the second surface at a first location disposed opposite a first of the protrusions that is formed on the first side of the body proximate the periphery of the body, a second location disposed opposite a second of the protrusions that is formed on the second side of the body proximate the periphery, and a third location disposed opposite a third of the protrusions formed on the second side of the body proximate the periphery, and wherein the second and third protrusions are located on opposite sides of the first spline.

15. The method of claim 14, wherein the step of machining, during the single machining operation, includes moving a cutting tool provided on a lathe to remove material from the periphery of the body as the body rotates about a rotational axis to form the first and second sealing faces, thereby providing a step-like structure on the periphery of the body.

16. The method of claim 15, wherein the step of machining, during the single machining operation, includes rotating the body so that a first side of the cutting tool engages and removes material from the first surface of the body at the first side of the body as the cutting tool moves in a cutting direction perpendicular to the rotational axis to form the first sealing face extending between a first end of the through bore and a second end of the through bore.

17. The method of claim 16, wherein the step of machining, during the single machining operation, includes rotating the body so that a second side of the cutting tool opposite the first side of the cutting tool engages and removes material from the second surface of the body at the second side of the body as the cutting tool moves in the cutting direction to form the second sealing face between the first end of the through bore and the second end of the through bore.

* * * * *